United States Patent
Burns

[11] 3,771,855
[45] Nov. 13, 1973

[54] LIQUID CRYSTAL DISPLAY PANEL

[75] Inventor: Carmen D. Burns, Plano, Tex.

[73] Assignee: Texas Instruments Incorporated, Dallas, Tex.

[22] Filed: May 1, 1972

[21] Appl. No.: 249,000

[52] U.S. Cl. .......................... 350/160 LC, 340/336
[51] Int. Cl. ............................................. G02f 1/16
[58] Field of Search ............... 350/160 LC; 340/336

[56] References Cited
UNITED STATES PATENTS
| | | | |
|---|---|---|---|
| 3,612,654 | 12/1971 | Klein et al. | 350/160 LC |
| 3,661,444 | 5/1972 | Matthies | 350/160 LC |
| 3,689,131 | 9/1972 | Klein et al. | 350/160 LC |
| 3,694,053 | 9/1972 | Kahn | 350/160 LC X |

*Primary Examiner*—Edward S. Bauer
*Attorney*—James O. Dixon et al.

[57] ABSTRACT

Disclosed is a liquid crystal display panel constructed from two plates of glass one of which is preferably only about 10 mils thick when the display panel is of the reflective type; the compartment containing the liquid crystal material is formed by etching a depression in one of the plates; the two plates are sealed together using a low viscosity, low outgassing epoxy material applied in such a way as to minimize the epoxy surface exposed to the liquid crystal material. Other features include a filling aperture seal means providing for thermal expansion to the liquid and minimum contamination, provision of a reflective surface on the exterior of the panels to provide the function of reflective electrodes while eliminating the necessity of contaminating reflective materials within the liquid compartment, masking of unsightly leads from the face of the panel and access to all electrical connections into the panel on a single surface.

3 Claims, 3 Drawing Figures

LIQUID CRYSTAL DISPLAY PANEL

A new type of alphanumeric visual display now coming into prominent use incorporates so-called liquid crystals. Liquid crystals are a class of organic liquids which exhibit some properties of ordered crystalline structure within certain temperature ranges. One class of liquid crystals now receiving considerable attention is nematic liquid crystals which are transparent to visible light but will become cloudy or opaque as a result of electrical current flow therein. The current flow is believed to cause turbulence in the liquid resulting in scattering of incident light. The phenomenon is referred to as dynamic scattering. Some of the materials suitable for use in liquid crystal displays are disclosed in patent application Ser. No. 068,280 filed Aug. 31, 1970 by L. T. Creagh et al, now U. S. Pat. No. 3,716,289, and application Ser. No. 148,759 filed June 1, 1971 by L. T. Creagh, now U.S. Pat. No. 3,655,270, both assigned to the assignee of the present application.

Visual displays of letters or numbers can be formed using a thin (0.5 to 1.0 mil) layer of a nematic liquid crystal sealed between two sheets of glass. For the reflective type of display panel conductive transparent electrodes on the inside surface of the front sheet and a transparent, highly reflective electrode on the inner surface of the back sheet are provided for each digit. When a voltage is applied to the opposing electrodes causing a current to flow in the liquid between the electrodes, the liquid loses its transparency in that region thus presenting to an observer an image in the shape of the electrodes from transmitted or reflected light. For the transmissive type of display panel the structure is similar but the back electrodes are transparent and a light source is placed behind the panel.

Although liquid crystal display panels are relatively uncomplicated, several problems exist in the manufacture of the structure. For example, it is difficult to provide an effective seal to enclose the nematic liquid between the two glass plates such that the sealant will not have detrimental effects on the liquid. Also, it has been found that the highly reflective and conductive back electrodes when made of metal are unreliable in contact with the liquid and tend to limit the life of the unit. Difficulty has been experienced in providing electrical connections from the exterior of the panel through an effective seal to the interior electrodes. Difficulties have arisen also in maintaining a uniform thickness of the liquid compartment in relatively large display panels. Further, unsightly conductive patterns for internal electrical contact to the electrodes are often undesirable. Thermal expansion of the nematic liquid and other parts of the display panel make it difficult to provide an effective seal at the fluid filling aperture. The present invention offers effective practical and inexpensive solutions to the above-noted problems in the manufacture of liquid crystal display panels.

THe novel features characteristic of the present invention are set forth in the appended claims; however, the invention itself and its advantages may be best understood from the following detailed description and the accompanying drawings wherein:

Figure 1:
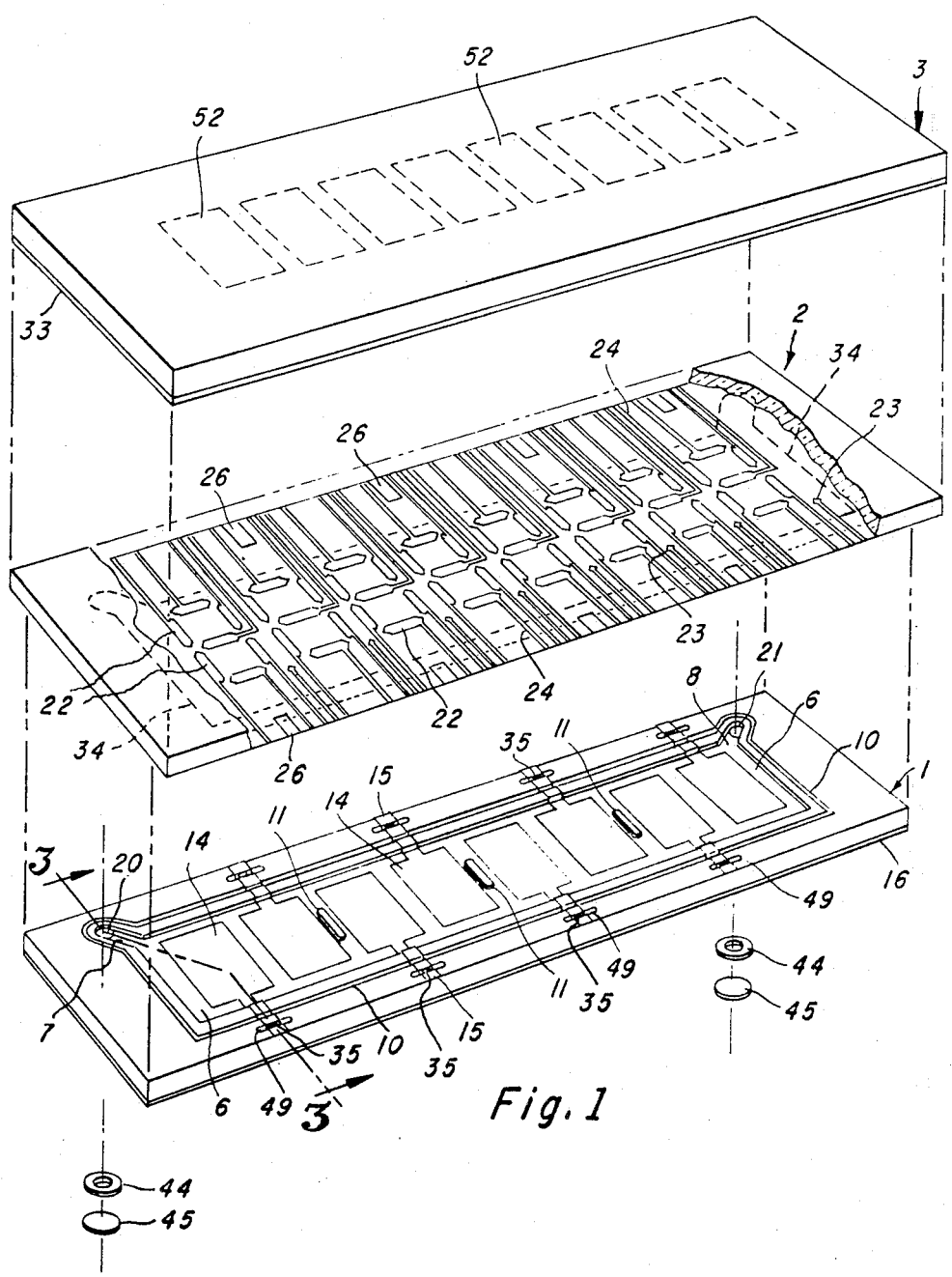
FIG. 1 is an exploded view in perspective illustrating the features of the several components of one embodiment of the display panel of the present invention.

With particular reference now to FIG. 1, the liquid crystal display panel of the present invention comprises a back plate 1, a front plate 2, and a face plate 3.

The back plate 1 may be made of glass of a suitable type and may, for example, be about the size and thickness (about 50 to 75 mils) of an ordinary microscope slide. However, in order to achieve certain advantages of the present invention as explained hereinafter, the back panel for reflective displays is preferably made from a sheet of very thin glass, preferably about 10 mils thick and of an appropriate size for the desired panel. Suitable glass sheets are commercially obtainable in the form of thin sheets having a thickness of from 2 to 30 mils from Corning Glass Company under the name Microsheet.

The back panel has a depression or cavity 6, which may be of any desired shape but is shown as of a generally rectangular shape. This cavity may be produced in the back panel conveniently by masking the sheet except in the desired areas of the cavity and etching the exposed portions to a uniform depth of about 0.5 to 1.0 mils. One suitable etch solution for this purpose is a mass transport limited polishing etch comprising from 4 percent to 12 percent, preferably about 8 percent by volume hydrofluoric acid, about 8 percent by volume of a liquid detergent such as shampoo or dishwashing liquid, and from 0 to about 4 percent by volume glycerine and the remainder deionized water. Best results are achieved when the panel glass is of drawn glass or other glass where the surface is not the mechanically polished type such as Corning 7059. The cavity, although generally rectangular in shape, has two small channels 7 and 8 which, as will be explained in more detail later, are used in filling the panel with the crystalline liquid. As an optional feature, the seal area, i.e., the original surface surrounding the cavity, may be provided with a moat 10 which can conveniently be produced by etching at the same time as the cavity itself is produced. The moat may be used in providing a hermetic seal between the front plate and the back plate.

As another optional feature, small areas of the cavity may be masked before the etching step so that support posts or spacers 11 are provided to maintain the uniform spacing between the front and back plates in larger display panels of the reflective type in which flexing of the two thin plates might cause problems.

After shaping the back plate, conductive electrodes 14 are applied to the bottom of the cavity. These electrodes and their conductive lead-ins 15 are applied by known masking and evaporating techniques. According to one of the features of this invention, the electrodes are a thin coating of essentially transparent electrically conductive material of which several are known, such as indium oxide containing from 5 percent to 15 percent by weight tin oxide. By this means, some of the reliability problems of the prior art devices which used metallic reflective electrodes are avoided since, in the present structure, no metal will be in contact with the nematic liquid crystal in the cavity. If the display panel is to be of the reflective type, the back plate is completed by applying a reflective coating 16, for example aluminum, to the back side of the plate 1. Two fill apertures 20 and 21 are positioned on the back plate leading into the fill channels 7 and 8.

Figure 2:
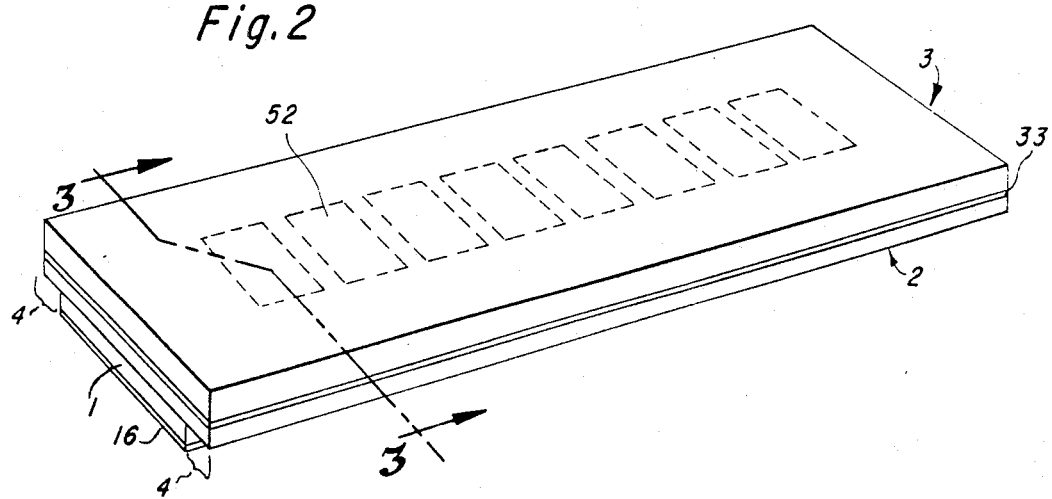
FIG. 2 is a view in perspective illustrating the display panel of FIG. 1 assembled.

The front plate 2 of the display panel of the present invention may also be from a thin sheet of glass preferably about 10 mils thick and of appropriate size depending on the size of the display desired. The front plate is made slightly wider than the back plate in order to provide an overhanging ledge area or areas best seen at 4 in FIG. 2 on which are provided the external contacts to the internal electrodes of the panel. On the underside of the front plate, or what is to be the inner surface of the panel, are placed the digit segment 22 and decimal point 23 segment electrodes and their respective leads 24. These electrodes and leads are of a conductive essentially transparent material which may be of the same or similar material to the electrodes on the back plate. These electrodes and leads likewise may be applied by known masking and evaporation techniques. The individual segment electrodes are so arranged that by selective application of excitation current any desired numeral, letter or symbol may be displayed. For example, with the "figure eight" arrangement shown, any arabic numeral from 0 to 9 may be displayed. At the same time the above-mentioned electrodes and leads are applied to the front plate, additional conductive areas 26 may be applied to the plate which will be in registration with the electrode leads of the back plate when the two plates are assembled into the panel. These conductive areas 26 will provide electrical contact to the back electrodes when the panel is assembled. In this way contacts for all the electrodes are available on the one surface of the front plate.

In order to provide a color or dark background or to provide various shapes of display areas for the panel, and also to hide the not completely transparent electrode leads which may be unsightly and thus undesirable in certain applications of the display panels, an additional face plate 3 may be used in the display panel assembly. The face plate is preferably made of glass but may be of any suitable material and is of the same size as the front plate. It may be of any desired thickness; from about 50 to about 75 mils has been found to be suitable. A layer of epoxy glue 33 is applied to the back of the face plate and serves the dual purpose of providing the masking design and of holding the face plate to the front plate of the panel. The epoxy glue may be applied to the face plate by "silk-screen" printing or similar methods with dark or colored epoxy applied to the areas to be masked and clear epoxy applied to the areas to be left unmasked, i.e., the digit areas 52. Thus, there is a uniform thickness of the coating 33 over the entire face plate so that distorting air bubbles and parallax problems are avoided.

It is to be realized that when masking in the display panel is not desired, or in displays large enough that parallax does not present a problem, no face plate need be used and the front plate 2 may be made much thicker to provide the desired structural strength and rigidity in the panel. Of course, a rigid backing plate of suitable material may be attached to the back plate as the only or as a supplemental stiffening member. For transmissive type displays both front and back plates may be of the thicker glass.

To assemble the liquid crystal display panel of the present invention a thin film of nonconducting epoxy or other suitable sealant is placed on the surface of either the front or back plate along the seal line which is positioned approximately as indicated by the dashed line 34 in the figures. This is done after the electrodes and leads have been applied to each plate and may be done before but preferably after the reflective coating 16 and backing plate, if any, are applied to the back plate 1 and either before or after the face plate and mask, if any, are applied to the front plate. If the moat mentioned earlier is provided in the back plate, the epoxy sealant should just fill it. In addition, a small area film of conductive epoxy 35 is placed at the outer end (outside the seal line), of each of the deposited back electrode leads 15. A small depression 49 may be provided in the back plate for this purpose. The front and back panels are then pressed together with the front and back electrodes in registration, and the back electrode leads 26 on the front panel in contact with the conductive epoxy glue areas placed on the back electrode leads 15 of the back panel. The plates are held thus until the sealant has been cured or hardened to produce a hermetic seal.

In order to fully realize the advantages of the present invention, the seal between the front and back plates of the panel should approach as nearly as possible the following characteristics. The sealant should have as little surface area as possible in communication with the liquid compartment. Ideally, the two glass plates should be in contact with each other over most of their mating surfaces with the sealant just filling the voids between the plates resulting from the slight imperfections in the surfaces. However, the deposited electrode leads which must pass through the seal area have a finite thickness and thus the surfaces of the two plates must be separated by a distance at least as great as the electrode lead thickness. Excellent results have been achieved in the present invention when the sealant thickness between the plates is approximately 0.05 micron but up to a 1-micron thickness, and in some instances up to a 3-micron thickness, will yield acceptable results.

Such results have been obtained using an epoxy sealant which has viscosity low enough to be applied by "screen" printing methods and has a weight change by outgassing during curing of less than 1 percent. Abelstik Co. "Epoxy 342–1" is such a sealant. A silver-filled epoxy of similar characteristics by the same manufacturer designated "609" is suitable for use as the conductive epoxy 35.

Limitation of the surface area of the sealant exposed to the liquid crystal material and use of a sealant with very low outgassing prevents contamination of the liquid crystal material making possible low current AC and DC operation of the panel.

Figure 3:
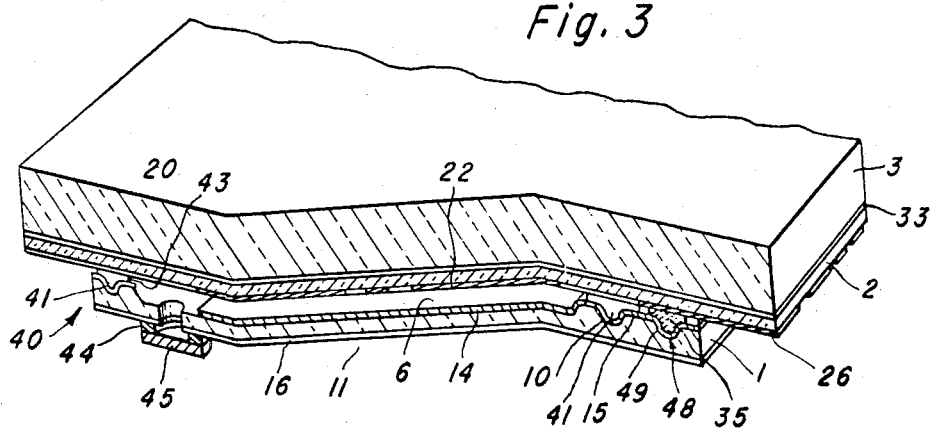
FIG. 3 is a view in section taken along lines 3 — 3 of FIG. 2.

FIG. 3 illustrates some of the desirable features of the sealing arrangement described above. Thickness as well as lateral dimensions of the various elements shown are greatly distorted to facilitate the illustration.

At the area 40 is shown the seal area of the panel in detail. As can be seen, the epoxy glue or sealant 41 fills the seal moat and provides a very thin flim of sealant between the flat surfaces of the back and front plates 1 and 2. As stated above, the use of the moat is optional and the two plates may be sealed together with only a thin film of the sealant between them. Either way, the liquid of the cell contacts only the glass and the thin edge 43 of the film of the sealant and is therefore much less subject to contamination than in other types of presently used configurations.

After sealing the panels together, the panel cell may be filled with the liquid crystal fluid through one of the fill apertures. Filling of the cell should be carried out in an atmosphere of inert gas such as, for example, pure nitrogen at approximately normal atmospheric pressure. The fluid compartment should be free of bubbles but the fill aperture should contain some gas. After filling, the cell is sealed using a small glass washer 44 and a small glass disk or wafer 45 over the fill aperture. The wafer and washer may be of "Microsheet" glass. Such an arrangement allows a cushion for the thermal expansion of the fluid in the cell through compression of the trapped inert gas in the fill aperture and the slight flexing of the cover wafer.

The seal between the washer, the disk and the plate should have the same characteristics as the seal between the front and back plates. The same type of epoxy applied, as before, by "screen" printing techniques has been found satisfactory. It is important that the inside diameter of the washer be somewhat larger than the diameter of the fill aperture to ensure that the surface area of the sealant from which outgassing into the fluid compartment can occur is limited. Instead of the washer and disk sealing means shown, a small disk of glass or "Microsheet" glass with a depression etched in one side may be used. The diameter of the depressions should be greater than the fill aperture.

It should be noted that the fill aperture may be on either the front or back plate of the panel but it should be positioned such that it passes through only one plate thus avoiding exposure of more sealant surface outgassing into the compartment.

The arrangement for bringing the electrical connection to the back electrode out to the back surface of the front plate is shown in detail at 48. As shown, the conductive material of the lead is deposited across the front surface and wall of the compartment 6, across the front surface of the back plate and the seal moat 10 to the edge of the back plate. It is often convenient, but not necessary, to provide a slight depression 49 (which may be etched) near the end of the deposited lead close to the edge of the back plate. Electrical contact between the lead 15 on the back plate and the lead 26 on the front plate is achieved by placing a small amount of conductive epoxy 35 in the depression 49 for each lead or on the area of the back plate lead outside the seal line before the plates are sealed together. Thus, electrical contact can be made to both the back and the front electrodes of the finished cell on a single surface, i.e., the back of the front plate. A convenient means of providing electrical signals to these contacts is through use of a multiconductor flat flexible cable of the type now commercially available. Such a cable consists essentially of a flexible sheet of plastic such as "Mylar" with several thin narrow strips of copper adhered to one side in a fashion reminiscent of etched circuits. The electrode contacts are deposited on the front plate spaced to match the spacing of the conductors of such a flat flexible cable. Conductive epoxy is then used to connect each contact to its respective conductor in the cable.

Thus there has been disclosed a liquid crystal display panel structure wherein the liquid crystal fluid is protected from contamination since no metal electrodes are required within the cell itself and in contact with the fluid and there is only a minimum contact of the fluid with the panel sealing material. The panel also provides the convenience of having all of the external contacts to the internal electrodes available on a single surface. Further, the structure allows for thermal expansion of the fluid within the cell without undue stress and strain which could cause rupture of the sealed cell. In addition, the panel contains features to maintain in large displays the required uniformity of spacing between the front and back walls of the fluid cavity. And, if aesthetically desirable, the panel may be provided with a protected masking for display background color or design which will also function to hide unsightly electrode contacts and connections within the cell.

What is claimed is:

1. A liquid crystal display panel comprising a back plate and a front plate sealed together and defining therebetween a compartment for receiving a liquid crystal material; said back plate being of a transparent material 'ess than about 20 mils thick and having an area of reduced thickness defining said compartment and further having a depression surrounding said area of reduced thickness and unconnected therewith, said back plate having deposited thereon essentially transparent conductive electrodes of indium oxide within said compartment area and electrically conductive leads extending from respective ones of said electrodes through said depression and terminating near the edge of said back plate; said front plate being of a transparent material and wider than said back plate and having deposited thereon essentially transparent conductive electrodes of indium oxide containing from 5 percent to 15 percent tin oxide within said compartment area and electrically conductive leads extending from respective ones of said electrodes to near the edge of said plate, said front plate further having deposited thereon in registration with the leads of said back plate electrically conductive areas extending from near the edge of said front plate to at least a region overlapping the leads of said back plate; the seal between said plates being comprised of a region of epoxy sealant adhering to each plate in an area surrounding said compartment and including said depression, said sealant being of a thickness no greater than 3 microns at its edge surface communicating with said compartment; an electrically conductive epoxy material in contact with each of said leads of said back plate and respective ones of said areas of said front plate whereby electrical contact to all of said leads on both of said plates is available on said front plate; one of said plates having defined therein at least one fill aperture communicating with said compartment, said fill aperture being hermetically sealed with a capping member comprising a thin glass washer having an inside diameter greater than the diameter of said fill aperture and a glass disk less than about 20 mils thick sealed to said washer; and said compartment being filled with a liquid crystal material and said at least one fill aperture containing dry nitrogen gas at normal atmospheric pressure.

2. A liquid crystal display panel as defined in claim 1 wherein said back plate has a reflective coating of aluminum on its exterior back surface.

3. A liquid crystal display panel as defined in claim 1 wherein said compartment has within it as least one spacer comprised of original material of said back plate remaining after the formation of said reduced thickness area defining said compartment.

* * * * *